United States Patent Office 3,275,648
Patented Sept. 27, 1966

3,275,648
AZLACTONES AND PREPARATION OF SAME
Harry L. Slates, Florham Park, and Norman L. Wendler, Summit, N.J., assignors to Merck & Co., Inc., Rahway, N.J., a corporation of New Jersey
No Drawing. Filed Dec. 31, 1963, Ser. No. 334,691
5 Claims. (Cl. 260—307)

This invention relates to certain azlactones and to the transformation of these azlactones by means of ultraviolet light. More specifically, this invention relates to the racemization of D-2,4-diloweralkyl-4-(3,4-diloweralkanoyloxybenzyl)-azlactones to DL-2,4-diloweralkyl-4-(3,4-diloweralkanoyloxybenzyl)-azlactones and to the degradation of D-2,4-diloweralkyl-4-(3,4-diloweralkoxybenzyl), (3-loweralkoxy-4 - loweralkanoyloxy) and (3-loweralkanoyloxy-4-loweralkoxy)-azlactone, with ultraviolet light, and to processes using these reactions and to new azlactones as compounds.

The discovery that α-methyl-3,4-dihydroxy phenylalanine (also referred to as α-methyl DOPA) is a potent antihypertensive is a great advance in the treatment of hypertension. This compound can be prepared from various intermediates; such as 3,4-diloweralkoxybenzyl (3-loweralkoxy-4-loweralkanoyloxybenzyl), (3 - loweralkanoyloxy-4-loweralkoxybenzyl), methyl ketones and α-loweralkyl-N-loweralkanoyl-3,4 - diloweralkanoyloxyphenylalanines. The two syntheses, which have been used to prepare this amino acid, produce a racemic mixture. The antihypertensive activity, however, resides in the L-form only and resolution of the racemic mixture accumulates large quantities of the inactive D-form, representing large economic waste. Therefore, in order to reduce the eventual cost to the consumer, it is necessary to convert this D-form to the L-form.

We have found that, whereas certain quaternary α-amino acids are unaffected by exposure to ultraviolet light, formation of an azlactone derivative of these compounds changes their basic chemistry to such an extent that subsequent exposure to ultraviolet light causes racemization in one group of azlactones and degradation in others. Therefore, we find that when D-α-lower alkyl-3,4-dihydroxy, (3-hydroxy-4-loweralkoxy), (3 - loweralkoxy-4-hydroxy) and (3,4-diloweralkoxy) phenylalanine are converted to D-2,4-diloweralkyl-4-(3,4-diloweralkanoyloxybenzyl), (3-loweralkanoyloxy - 4 - loweralkoxybenzyl), (3-loweralkoxy-4-loweralkanoyloxybenzyl) and (3,4-diloweralkoxybenzyl)-azlactone respectively, subsequent exposure to ultraviolet light produces racemization of the (3,4-diloweralkanoyloxybenzyl)-azlactone to the corresponding DL-form, and degradation of the (3-loweralkanoyloxy-4-loweralkoxybenzyl), (3 - loweralkoxy-4-loweralkanoyloxybenzyl) and (3,4-diloweralkoxybenzyl)-azlactones to the corresponding ketones. Both the ketones and the DL-3,4-diloweralkanoyloxybenzyl-azlactones are highly useful intermediates for the preparation of the racemic amino acids. These racemic amino acids may be prepared by heating the said ketones with ammonium carbonate in a water soluble cyanide salt in an aqueous solution to form a hydantoin derivative. This hydantoin derivative is then hydrolyzed to the said racemic amino acids. The azlactone intermediates may be treated with an aqueous solution of a hydrohalic acid to obtain the said amino acids.

It is an advantage of our invention that (1) certain D-quaternary-α-amino acid compounds can be converted to azlactone derivatives which are reactive to ultraviolet light and form intermediates from which the DL-quaternary-α-amino acids can be prepared, and (2) utilization of the D forms of certain D-quaternary-α-amino acids compounds eliminates economic waste.

In accordance with this invention certain D-azlactones (which have been prepared by the reaction of certain (D) quaternary amino acids with a lower alkanoic acid anhydride) are converted by means of ultraviolet light to either a DL-azlactone or to a corresponding ketone. The said DL-azlactone is further reacted to form corresponding DL-amino acid derivatives.

In accordance with one aspect of this invention a D-2,4-diloweralkyl-4-(3,4 - diloweralkanoyloxybenzyl)-azlactone is exposed to ultraviolet light to form the corresponding DL-azlactone. When a D-2,4-diloweralkyl-4-(3,4-diloweralkoxybenzyl), (3-loweralkoxy-4 - loweralkanoyloxybenzyl) or (3-loweralkanoyloxy-4-loweralkoxybenzyl)-azlactone is exposed to ultraviolet light, racemization does not occur, but rather the compound is degraded to the corresponding α-lower alkyl-3,4-diloweralkoxybenzyl, (3-loweralkoxy-4-loweralkanoyloxybenzyl) lower alkyl ketone or (3-loweralkanoyloxy-4-loweralkoxybenzyl)-lower alkyl ketone respectively. In accordance with another aspect of this invention, a D-α-lower alkyl-3,4 - diloweralkanoyloxyphenylalanine is reacted with a lower alkanoic acid anhydride to form a D-2,4-diloweralkyl-4 - (3,4 - diloweralkanoyloxybenzyl)-azlactone, exposure of this D-azlactone to ultraviolet light yields the corresponding DL-azlactone and hydrolysis of this DL-azlactone yields a DL-α-loweralkyl-N-lower alkanoyl-3,4 - diloweralkanoyloxyphenylalanine. In accordance with a still further aspect of this invention a D-α-lower alkyl-(3,4-diloweralkoxy), (3-loweralkoxy-4-loweralkanoyloxy) or (3-loweralkanoyloxy-4 - loweralkoxy)-phenylalanine reacted with a lower alkanoic acid anhydride to form a D-2,4-diloweralkyl-4-(3,4-diloweralkoxybenzyl), (3-loweralkoxy-4-loweralkanoyloxybenzyl) or (3-loweralkanoyloxy-4-loweralkoxybenzyl)-azlactone respectively and exposure of this D-azlactone to ultraviolet light forms an α-lower alkyl-3,4-diloweralkoxybenzyl, (3-loweralkoxy-4-loweralkanoyloxybenzyl) or (3-loweralkanoyloxy-4-loweralkoxybenzyl)-loweralkyl ketone respectively.

In carrying out the above processes, the starting 3,4-dihydroxy, (3,4-diloweralkoxy), (3-loweralkoxy-4-loweralkanoyloxy) or (3-loweralkanoyloxy-4-loweralkoxy)-α-lower alkyl phenylalanine may have any α-lower alkyl substituent, as for example, methyl, ethyl, propyl, pentyl and the like (preferably α-methyl). The lower alkoxy may be methoxy, propoxy, amyloxy and the like, preferably methoxy. The lower alkanoyloxy may be acetoxy, propionyloxy and the like, preferably acetoxy.

FLOW SHEET I

The processes may be illustrated as follows:

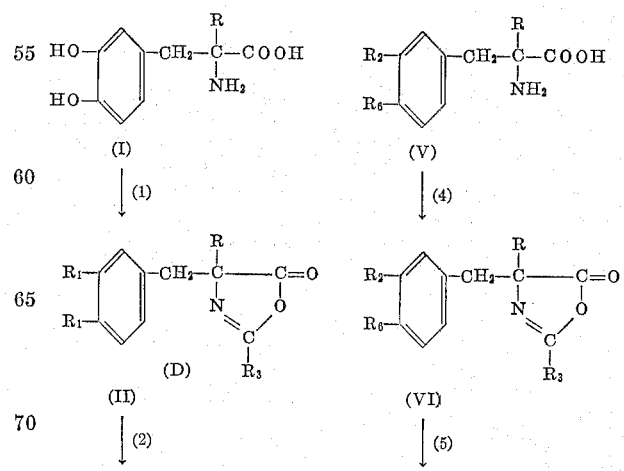

FLOW SHEET I—Continued

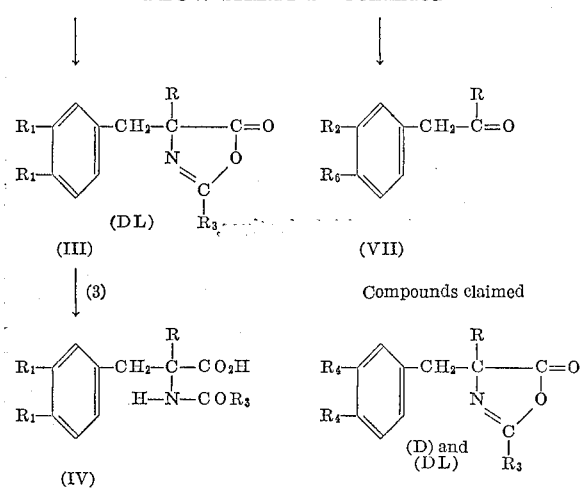

Equivalents:

R=lower alkyl [such as methyl, propyl and amyl (methyl preferred)]

$R_1$=lower alkanoyloxy [such as acetoxy and propionyloxy (acetoxy preferred)]

$R_2$ and $R_6$=lower alkoxy and lower alkanoyloxy, only one of $R_2$ or $R_6$ being lower alkanoyloxy at any one time; such as methoxy ethoxy propoxy; amyloxy, acetoxy, propionyloxy and valeryloxy.

$R_3$=lower alkanoyl [such as acetyl and propionyl (acetyl preferred)]

$R_4$=lower alkoxy or lower alkanoyloxy (methoxy or acetoxy preferred)

REACTION AND CONDITIONS

Step 1. Reaction of Compound I in an acid binding agent, such as pyridine, with a lower alkanoic acid anhydride such as acetic anhydride, butyric anhydride, pentanoic anhydride and the like (preferably acetic anhydride) at any suitable temperature (reaction time varies with temperature, room temperature preferred).

(2) Exposing Compound II to ultraviolet light (preferably a solution of Compound II), until the reaction is substantially complete (reaction time varies with the intensity of the ultraviolet light).

(3) Reaction of Compound III with water (preferably a solution of acetone and water) at any desired temperature (reaction time varies with temperature, steam bath preferred).

(4) Carried out same as Step 1; starting with Compound V.

(5) Exposing Compound VI to ultraviolet light (preferably a solution of Compound VI), until the reaction is substantially complete (reaction time varies with the intensity of the ultraviolet light).

The formation of the azlactone (indicated as Step 1 as well as Step 4), requires the use of an acid binding agent, which will neutralize the acid byproduct formed from the reaction. The acid binding agent may be an organic base (such as picoline, pyridine, dimethylaniline, quinoline and the like); or a solution of $CaCO_3$ or $Na_2CO_3$ in an inert solvent (pyridine is preferred). This neutralization is necessary to prevent the conversion of the azlactone back to the amino acid. In addition, this organic base must be one which does not enter into the reaction. When using an acid binding agent such as pyridine, both the pyridine and the anhydride employed will also serve as solvents for the reaction. In the reaction of Step 1, at least 3 moles of anhydride to one mole of Compound I are employed. When less anhydride is used, the reaction will not go to completion. It is preferred to use an excess of acetic anhydride, 3 moles for the reaction and the additional amount as solvent. Any suitable excess may be used which will be effective as a solvent. In addition, for each mole of Compound I at least 3 moles of acid binding agent are employed. When less than 3 moles are used, the reaction (as stated previously) will not go to completion. In the preferred procedure, an excess of pyridine is employed, 3 moles to neutralize the acetic acid formed and the additional amount to act as solvent for the reaction. Here, as in the case of the anhydride, any suitable excess may be used which will be effective as a solvent. The same limitations and preferred conditions exist when Step 4 is employed. In this case only one mole of acid binding agent and anhydride are necessary for the reaction itself and the excess acid binding agent and anhydride are used as solvents.

The reaction of the azlactone with ultraviolet light (1800–3900 Angstrom units, range of approximately 2900–3200 A. preferred) (as indicated in both Steps 2 and 5) may be run without a solvent, but it is highly preferred to employ an inert solvent. Such solvent must transmit ultraviolet light and be incapable of reacting with the azlactone. Dioxane, ethers and some hydrocarbons may therefore be used as solvents, although dioxane is the solvent of choice. The reaction time appears to be a function of the intensity of the ultraviolet light employed, and can therefore be varied by changing the intensity of the ultraviolet light. In addition, the reaction may be run at any convenient temperature, however room temperature is preferred. The effect of reaction, and therefore, the time required for substantial completion can be determined by following the loss of optical activity.

Hydrolysis of the DL-azlactone (Step 3) may be accomplished with water, but it is preferred to use a solution of an inert water soluble organic solvent and water (such as acetone-$H_2O$). This mixture will enhance the solubility of the DL-azlactone and lead to more effective reaction. Any desired amount of water acetone may be used, which will effect solution and allow complete hydrolysis.

In the case of Step 5, the reaction of the D-azlactone with ultraviolet light produces the degraded ketone directly, no water being necessary, although water has been used after exposure of the D-azlactone to ultraviolet light with the same results.

The following examples are given by way of illustration.

*Example 1.—D(+)-2,4-dimethyl-4-(3,4-diacetoxy-benzyl)-azlacetone*

A solution of 10 grams of D(+)-α-methyl-3,4-dihydroxyphenylalanine in 70 ml. of pyridine and 50 ml. of acetic anhydride is allowed to stand at room temperature overnight. The solvents are removed in vacuo and the residue is distilled at 160–170° at 0.05 mm. in a short path still. There is obtained 9 grams of D(+)-2,4-dimethyl-4-(3,4-diacetoxybenzyl)-azlactone as a colorless viscous oil $[\alpha]_D$ +67°.

When the above procedure is followed using propionic anhydride and pentanoic anhydride in place of acetic anhydride in the above example, there are obtained D(+)-2-ethyl-4-methyl-4-(3,4-dipropyionyloxybenzyl)-azlactone and D(+)-2-butyl-4-methyl-4-(3,4-divaleryloxybenzyl)-azlactone respectively.

When the above procedure is followed using D(+)-α-propyl-3,4-dihydroxy-phenylalanine and D(+)-α-pentyl-3,4-dihydroxyphenylalanine in place of D(+)-α-methyl-3,4-dihydroxy-phenylalanine in the above example, there are obtained D(+)-2-methyl-4-propyl-4-(3,4-diacetoxybenzyl)-azlactone and D(+)-2-methyl-4-pentyl-4-(3,4-diacetoxybenzyl)-azlactone respectively.

*Example 2.—DL-2,4-dimethyl-4-(3,4-diacetoxy-benzyl)-azlactone*

A solution of 600 mg. of D(+)-2,4-dimethyl-4-(3,4-diacetoxy benzyl)-azlactone in 20 ml. of dioxone is irradiated for 6 days in a quartz flask with a high pressure mercury arc ultraviolet lamp. The solvent is removed in vacuo to yield crude DL-2,4-dimethyl-4-(3,4-diacetoxybenzyl)-azlactone.

When the above procedure is followed using

D(+)-2-ethyl-4-methyl-4-(3,4-dipropionyloxybenzyl)-azlactone,
D(+)-2-butyl-4-methyl-4-(3,4-divaleryloxybenzyl)-azlactone,
D(+)-2-methyl-4-propyl-4-(3,4-diacetoxybenzyl)-azlactone,
D(+)-2-methyl-4-pentyl-4-(3,4-diacetoxybenzyl)-azlactone, in place of
D(+)-2,4-dimethyl-4-(3,4-diacetoxybenzyl)-azlactone, in the above example, there are obtained the corresponding DL-azlactones.

*Example 3.—DL-α-methyl-2,3-dihydroxyphenylalanine triacetate*

The crude DL-2,4-dimethyl-4-(3,4-diacetoxybenzyl)-azlactone from Example 2 is taken up in aqueous acetone and warmed on a steam bath for one hour. The solid product is separated and recrystallized from acetone-hexane. There is obtained α-methyl-3,4-dihydroxyphenylalanine triacetate, M.P. 176–179 [α]$_{546}$ +49.4°, showing 20% racemization.

When the above procedure is followed using

DL-2-ethyl-4-methyl-4-(3,4-dipropionyloxybenzyl)-azlactone,
DL-2-butyl-4-methyl-4-(3,4-divaleryloxybenzyl)-azlactone,
DL-2-methyl-4-propyl-4-(3,4-diacetoxybenzyl)-azlactone and
DL-2-methyl-4-pentyl-4-(3,4-diacetoxybenzyl)-azlactone, obtained from Example 2, in place of
DL-2,4-dimethyl-4-(3,4-diacetoxybenzyl)-azlactone
in the above example, there are obtained
DL-α-methyl-3,4-dihydroxyphenylalanine tripropionate,
DL-α-methyl-3,4-dihydroxyphenylalanine tripentanoate,
DL-α-propyl-3,4-dihydroxyphenylalanine triacetate and
DL-α-pentyl-3,4-dihydroxyphenylalanine triacetate respectively.

*Example 4.—D(+)-2,4-dimethyl-4-(3,4-dimethoxybenzyl)-azlactone*

A solution of 4 grams of D(+)-α-methyl-3,4-dimethoxyphenylalanine, 30 mls. of pyridine and 20 ml. of acetic anhydride is allowed to stand at room temperature overnight. The solvents are removed in vacuo and the residue is crystallized from ether-hexane to yield 3.5 grams of D(+)-2,4-dimethyl-4-(3,4-dimethoxybenzyl) - azlactone, M.P. 91–92° [α]$_D$ +84.2°.

When the above procedure is followed using

D(+)-α-propyl-3,4-dimethoxyphenylalanine,
D(+)-α-pentyl-3,4-dimethoxyphenylalanine,
D(+)-α-methyl-3,4-dipropoxyphenylalanine and
D(+)-α-methyl-3,4-diphentoxyphenylalanine
in place of
D(+)-α-methyl-3,4-dimethoxyphenylalanine
in the above example there are obtained
D(+)-4-propyl-2-methyl-4-(3,4-dimethoxybenzyl)-azlactone,
D(+)-4-pentyl-2-methyl-4-(3,4-dimethoxybenzyl)-azlactone,
D(+)-2,4-dimethyl-4-(3,4-dipropoxybenzyl)-azlactone and
D(+)-2,4-dimethyl-4-(3,4-dipentoxybenzyl)-azlactone respectively.

When the above procedure is followed using propionic anhydride and pentanoic anhydride in place of acetic anhydride in the above example, there are obtained D(+)-2-ethyl-4-methyl-(3,4-dimethoxybenzyl)-azlactone and
D(+)-2-butyl-4-methyl-(3,4-dimethoxybenzyl)-azlactone respectively.

*Example 5.—3,4-dimethoxybenzyl methyl ketone*

A solution of 1.1 grams of D(+)-2,4-dimethyl-4-(3,4-dimethoxybenzyl)-azlactone in 40 mls. of dioxane in a quartz flask is irradiated for 90 hours at room temperature with a high pressure mercury arc ultraviolet lamp equipped with a heat filter. (At this point the solution has lost 85% of its optical rotation.) The reaction mixture is concentrated in vacuo to a pale yellow oil. The oil is dissolved in 60 mls. of ether, washed with saturated potassium bicarbonate solution, dried over magnesium sulfate and concentrated in vacuo to yield 0.65 gram of essentially pure 3,4-dimethoxybenzyl methyl ketone.

When the above procedure is followed using

D(+)-2,4-dimethyl-4-(3,4-dipropoxybenzyl) azlactone,
D(+)-2,4-dimethyl-4-(3,4-dipentoxybenzyl) azlactone,
D(+)-2-methyl-4-propyl-4-(3,4-dimethoxybenzyl) azlactone, and
D(+)-2-methyl-4-pentyl-4-(3,4-dimethoxybenzyl)-azlactone
in place of
D(+)-2,4-dimethyl-4-(3,4-dimethoxybenzyl) azlactone
in the above example there are obtained
3,4-dipropoxybenzyl methyl ketone,
3,4-dipentoxybenzyl methyl ketone,
3,4-dimethoxybenzyl propyl ketone and
3,4-dimethoxy benzyl pentyl ketone respectively.

*Example 6.—D(+)-2,4-dimethyl-4-(3-methoxy-4-acetoxybenzyl)-azlactone*

A solution of 4 grams of D(+)-α-methyl-(3-methoxy-4-hydroxy) phenylalanine, 20 mls. of pyridine and 30 mls. of acetic anhydride is allowed to stand at room temperature overnight. The solvents are removed in vacuo and the residue is distilled through a short path column to yield D(+)-2,4-dimethyl-4-(3-methoxy-4-acetoxybenzyl)-azlactone.

When the above procedure is followed using

D(+)-α-methyl-(3-hydroxy-4-methoxy)-phenylalanine
in place of
D(+)-α-methyl-(3-methoxy-4-hydroxy)-phenylalanine,
in the above example, there is obtained
D(+)-2,4-dimethyl-4-(3-acetoxy-4-methoxybenzyl)-azlactone.

Similarly, when the above procedure is followed using

D(+)-α-propyl-(3-methoxy-4-hydroxy)-phenylalanine,
D(+)-α-amyl-(3-methoxy-4-hydroxy)-phenylalanine
in place of
D(+)-α-methyl-(3-methoxy-4-hydroxy)-phenylalanine
there are obtained
D(+)-2-methyl-4-propyl-4-(3-methoxy-4-acetoxybenzyl)-azlactone and
D(+)-2-methyl-4-amyl-4-(3-methoxy-4-acetoxybenzyl)-azlactone respectively.

Similarly, when the above procedure is followed using propionic anhydride and pentanoic anhydride in place of acetic anhydride there are obtained D(+)-2-ethyl-4-methyl-4-(3-methoxy-4-propionyloxybenzyl)-azlactone and
D(+)-2-butyl-4-methyl-4-(3-methoxy-4-valeryloxy)-azlactone respectively.

*Example 7.—3-methoxy-4-acetoxybenzyl-methyl ketone*

A solution of 1.1 grams of D(+)-2,4-dimethyl-4-(3-methoxy-4-acetoxybenzyl)-azlactone in 40 ml. of dioxane in a quartz flask is irradiated for 90 hours at room temperature with a high pressure mercury arc ultraviolet lamp equipped with a heat filter. The reaction mixture is concentrated in vacuum; the residue is dissolved in 60 ml. of ether, washed with saturated potassium carbonate solution, dried over magnesium sulfate and concentrated in vacuo to yield 3-methoxy-4-acetoxybenzyl-methyl ketone.

When the above procedure is followed using

D(+)-2,4-dimethyl-4-(3-propoxy-4-acetoxybenzyl)-azlactone,
D(+)-2,4-dimethyl-3-(3-pentoxy-4-acetoxybenzyl)-azlactone,
D(+)-2,4-dimethyl-4-(3-acetoxy-4-propoxybenzyl)-azlactone,
D(+)-2,4-dimethyl-4-(3-acetoxy-4-pentoxybenzyl)-azlactone,
D(+)-2-ethyl-4-methyl-4-(3-methoxy-4-propionyloxybenzyl)-azlactone,
D(+)-2-butyl-4-methyl-4-(3-methoxy-4-valeryloxybenzyl)-azlactone,
D(+)-2-ethyl-4-methyl-4-(3-propionyloxy-4-methoxybenzyl)-azlactone,
D(+)-2-butyl-4-methyl-4-(3-valeryloxy-4-methoxybenzyl)-azlactone,
in place of
D(+)-2,4-dimethyl-4-(3-methoxy-4-acetoxybenzyl)-azlactone,
there are obtained
(3-propoxy-4-acetoxybenzyl)-methylketone,
(3-pentoxy-4-acetoxybenzyl)-methylketone,
(3-acetoxy-4-propoxybenzyl)-methylketone,
(3-acetoxy-4-pentoxybenzyl)-methylketone,
(3-methoxy-4-propionyloxybenzyl)-methylketone,
(3-methoxy-4-valeryloxybenzyl)-methylketone,
(3-propionyloxy-4-methoxybenzyl)-methylketone,
(3-valeryloxy-4-methoxybenzyl)-methylketone,
respectively.

We claim:
1. A racemic compound of the formula:

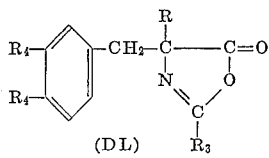

(DL)

in which

R is a lower alkyl
$R_3$ is a lower alkyl
$R_4$ is selected from the group consisting of lower alkoxy and lower alkanoyloxy.

2. DL-2,4-dimethyl-4-(3,4-diacetoxybenzyl)-azlactone.
3. A dextro compound of the formula:

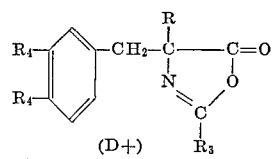

(D+)

in which

R is a lower alkyl
$R_3$ is a lower alkyl
$R_4$ is selected from the group consisting of lower alkoxy and lower alkanoyloxy.

4. A levo compound of the formula:

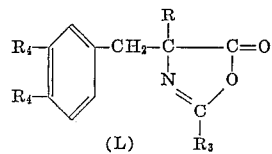

(L)

in which

R is a lower alkyl
$R_3$ is a lower alkyl
$R_4$ is selected from the group consisting of lower alkoxy and lower alkanoyloxy.

5. D-2,4-dimethyl-4-(3,4-dimethoxybenzyl)-azlactone.

References Cited by the Examiner
UNITED STATES PATENTS

| | | | |
|---|---|---|---|
| 2,599,587 | 6/1952 | Shwartzman | 204—158 |
| 2,840,565 | 6/1958 | Holly et al. | 260—307.3 |
| 3,062,826 | 11/1962 | Lunsford | 260—307.3 |
| 3,094,471 | 6/1963 | Merritt et al. | 204—158 |

OTHER REFERENCES

Finar, Organic Chemistry, volume 2, New York, Longmans, 1959, page 53.

ALEX MAZEL, *Primary Examiner.*

HENRY R. JILES, *Examiner.*

RICHARD J. GALLAGHER, *Assistant Examiner.*